United States Patent
Bai et al.

(10) Patent No.: US 10,865,337 B1
(45) Date of Patent: Dec. 15, 2020

(54) MULTI-FUNCTIONAL WEIGHTING AGENT FOR DRILLING FLUID AND PREPARATION METHOD THEREOF, AND WATER-BASED DRILLING FLUID AND USE THEREOF

(71) Applicant: Southwest Petroleum University, Sichuan (CN)

(72) Inventors: Yang Bai, Sichuan (CN); Pingya Luo, Sichuan (CN); Yan Cheng, Sichuan (CN); Jinsheng Sun, Shandong (CN); Guancheng Jiang, Beijing (CN)

(73) Assignee: Southwest Petroleum University, Sichuan (CN)

( * ) Notice: Subject to any disclaimer, the term of this patent is extended or adjusted under 35 U.S.C. 154(b) by 0 days.

(21) Appl. No.: 16/675,765

(22) Filed: Nov. 6, 2019

(30) Foreign Application Priority Data

May 20, 2019 (CN) .......................... 2019 1 0418791

(51) Int. Cl.
- *C09K 8/03* (2006.01)
- *C09K 8/12* (2006.01)
- *C08K 3/30* (2006.01)
- *C08L 33/26* (2006.01)

(52) U.S. Cl.
CPC .................. *C09K 8/03* (2013.01); *C09K 8/12* (2013.01); *C08K 3/30* (2013.01); *C08K 2003/3045* (2013.01); *C08L 33/26* (2013.01)

(58) Field of Classification Search
CPC ... C09K 8/03; C09K 8/12; C08K 3/30; C08K 2003/3045; C08L 33/26
See application file for complete search history.

(56) References Cited

U.S. PATENT DOCUMENTS

| | | | | |
|---|---|---|---|---|
| 2008/0064613 | A1* | 3/2008 | Massam | C09K 8/032 507/137 |
| 2009/0005271 | A1* | 1/2009 | Massam | C09K 8/032 507/140 |
| 2010/0009874 | A1* | 1/2010 | Ballard | C09K 8/03 507/118 |
| 2013/0233545 | A1* | 9/2013 | Mahoney | C09K 8/685 166/280.2 |

FOREIGN PATENT DOCUMENTS

| | | |
|---|---|---|
| CN | 102127318 A | 7/2011 |
| CN | 105199057 A | 12/2015 |
| CN | 109021940 A | 12/2018 |

OTHER PUBLICATIONS

Preparation and properties of KH570-AM-starch graft copolymer as filtrate reducing agents, Chemical Industry and Engineering Progress, 2018, No. 10; p. 4022-4028.
Novel water-based drilling fluid prepared from multifunctional treating agent and salt; Drilling Fludi & Completion Fluid; vol. 26 No. 2 Mar. 2019.

\* cited by examiner

*Primary Examiner* — Alicia Bland
(74) *Attorney, Agent, or Firm* — Duane Morris LLP

(57) ABSTRACT

The invention relates to the field of drilling fluid, and provides a multi-functional weighting agent for drilling fluid and preparation method thereof, and water-based drilling fluid and use thereof, wherein the multi-functional weighting agent is an polyacrylamide/modified barium sulfate composite multi-functional weighting agent prepared by sequentially dropwise adding acrylamide and ammonium persulfate to a mixture of modified barium sulfate and deionized water in a presence of an initiator.

19 Claims, No Drawings

MULTI-FUNCTIONAL WEIGHTING AGENT FOR DRILLING FLUID AND PREPARATION METHOD THEREOF, AND WATER-BASED DRILLING FLUID AND USE THEREOF

PRIORITY CLAIM & CROSS REFERENCE

The application claims priority to Chinese Application No. 201910418791.2, field on May 20, 2019, entitled "Multi-functional weighting agent for drilling fluid and preparation method thereof, and water-based drilling fluid and use thereof", which is specifically and entirely incorporated herein by reference.

FIELD OF THE INVENTION

The invention relates to the technical field of drilling fluid, and particularly relates to a multi-functional weighting agent for drilling fluid and preparation method thereof, and water-based drilling fluid and use thereof.

BACKGROUND

For the sake of ensuring the smooth operation in the process of drilling oil wells, the drilling fluid must exhibit comprehensive properties simultaneously. For example, it is necessary to add one or more lubricants into the drilling fluid in order to reduce the frictional resistance between the drilling tool and the casing and the frictional resistance between the drilling tool and the mud cake. For the sake of preventing excessive water loss of drilling fluid and protecting the well wall in a favorable manner, it is required to add the drilling fluid with a filtrate reducer. In addition, it is necessary to supplement the drilling fluid with a weighting agent and the like so as to control formation pressure and prevent collapse of stratum.

At present, there are dozens of drilling fluid treatment agents used in the oil drilling. It is necessary to add treatment agents having different functions in use according to the different on-site drilling conditions. If the mixing ratio of the treating agents is not desirable, the expected effects will not be achieved, or even produce an adverse effect, such as it is prone to cause the well wall to collapse, the downward drilling process encounters blocking or sticking. The more serious consequences may be that the whole well is scrapped, the inputted manpower and materials are wasted. Moreover, the simultaneous addition of a variety of treatment agents into the drilling fluid will increase the cost of the drilling fluid and aggrandize the labor intensity of the workers, and it results in the complicated composition of the drilling fluid and the increased difficulty in the maintenance and disposal.

Therefore, it is of great significance to research and develop a multi-functional treatment agent.

SUMMARY

To overcome the defect of the single function of the treatment agent existing in the prior art, and the defect that the poor synergistic effect of the treatment agents with different functions results in collapse of the well wall, the blocking or sticking encountered in the downward drilling process, the scrapping of the whole well, and the wastage of inputted manpower and materials, the present disclosure provides a multi-functional weighting agent for drilling fluid and preparation method thereof, and water-based drilling fluid and use thereof. The multi-functional weighting agent adopted by the invention has desirable weight-increasing performance due to its high sphericity and compressive strength, low friction force and good lubricity, and may reduce resistance in the drilling environment of high temperature and high pressure with small filter loss and desired application effects.

To attain the above object, in a first aspect, the present disclosure provides a method for preparing a multi-functional weighting agent, wherein the method comprises:
(1) mixing a modified barium sulfate with deionized water to obtain a mixture;
(2) heating the mixture and adjusting a pH of the mixture at a presence of an initiator;
(3) sequentially dropwise adding acrylamide and ammonium persulfate to step (2) for carrying out reaction;
(4) washing, drying and grinding the reaction product of step (3).

In a second aspect, the present disclosure provides a multi-functional weighting agent obtained by the aforementioned method, wherein the multi-functional weighting agent is an polyacrylamide/modified barium sulfate composite multi-functional weighting agent.

In a third aspect, the present disclosure provides a water-based drilling fluid, wherein the water-based drilling fluid contains the aforementioned multi-functional weighting agent or the multi-functional weighting agent prepared by using the aforementioned preparation method.

In a fourth aspect, the present disclosure provides a method of applying the aforementioned water-based drilling fluid in the oil drilling.

With the above technical scheme, the present disclosure provides a multi-functional weighting agent for drilling fluid, which may be easily prepared at a low cost, and has various functions such as lubrication, reducing resistance, preventing collapse, and decreasing filtrate loss, in order to reduce the types and numbers of multi-functional weighting agents used in preparation of the drilling fluid, reduce cost of the drilling fluid, alleviate the labor intensity of workers, and simplify the maintenance and disposal of the drilling fluid.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a multi-functional weighting agent for drilling fluid. In accordance with some embodiments the multi-functional weighting agent is an polyacrylamide/modified barium sulfate composite multi-functional weighting agent prepared by sequentially dropwise adding acrylamide and ammonium persulfate to a mixture of modified barium sulfate and deionized water in a presence of an initiator.

In some embodiments, the modified barium sulfate may be used in an amount of 5-20 parts by weight, the acrylamide may be used in an amount of 5-15 parts by weight, and the ammonium persulfate may be used in an amount of 0.3-6 parts by weight, based on 100 parts by weight of deionized water.

In some embodiments, the content of each component is strictly controlled such that the interaction between the components allows the prepared multi-functional weighting agent to exert an optimum effect during the drilling process, thereby enabling the prepared drilling fluid to reduce resistance in the drilling environment of high temperature and pressure with small filter loss and desired application effects. In some embodiments, it is preferably to produce optimum effects by arranging that the dosage of modified barium sulfate is 8-15 parts by weight, the dosage of acrylamide is 6-10 parts by weight, and the dosage of ammonium persulfate is 0.5-5 parts by weight, based on 100 parts by weight of deionized water.

In some embodiments, the modified barium sulfate may comprise modified barium sulfate A, modified barium sulfate B and modified barium sulfate C, which can be also called a first barium sulfate, a second barium sulfate, and a third barium sulfate, respectively. Preferably, the modified barium sulfate A has an average particle diameter of 0.05-0.45 μm, the modified barium sulfate B has an average particle diameter of 0.5-3 μm, and the modified barium sulfate C has an average particle diameter of 15-25 μm. In a preferable circumstance, when the weight ratio of the content of the modified barium sulfate A, the modified barium sulfate B and the modified barium sulfate C is (0.4-0.6):(0.4-0.6):1, the effects are good. More preferably, when the weight ratio of the content of the modified barium sulfate A, the modified barium sulfate B and the modified barium sulfate C is (0.45-0.55):(0.45-0.55):1, the effects are much better. The multi-functional weighting agent prepared in the present disclosure may have the functions such as lubrication, reducing resistance, preventing collapse, reducing filtrate loss simultaneously by means of strictly controlling the average particle diameter of modified barium sulfate A, modified barium sulfate B and modified barium sulfate C as well as the synergistic ratio of modified barium sulfate A, modified barium sulfate B and modified barium sulfate C.

In some embodiments, the initiator may be dimethyl azobisisobutyrate and/or sodium sulfite, preferably dimethyl azobisisobutyrate. In some embodiments, based on 100 parts by weight of deionized water, the initiator may be used in an amount of 0.1-4 parts by weight, more preferably 0.1-1 parts by weight. In some embodiments, when the initiator is a mixture of dimethyl azobisisobutyrate and sodium sulfite, the mass ratio of the dimethyl azobisisobutyrate relative to sodium sulfite may be (0.4-0.8):1. In addition, in some embodiments, it is desirable to control the content of initiator, because an addition of the initiator not only affects the polymerization rate, but also influences the molecular mesh structure of the polymer. When the added amount of the initiator is too small, the amount of free radicals in the reaction system is excessively low such that the crosslink density is low, and it is disadvantageous for forming the three-dimensional mesh structure, and the molecular weight of the synthesized polymer is relatively small, which indicates that the water absorption rate is low. When the added amount of the initiator is excessive, although it will accelerate the polymerization rate, an excess of the initiator tends to cause a phenomenon of implosion, which causes a decreased molecular weight and a high crosslinking density, which is also disadvantageous for forming a three-dimensional mesh structure and may result in a decreased water absorption ratio. Therefore, the effects are optimum under the conditions of the specific initiator and the content of the initiator defined in the invention.

In some embodiments, the multi-functional weighting agent provided in the present disclosure is a composite comprising polyacrylamide and modified barium sulfate as described. In some embodiments, the modified barium sulfate may comprise modified barium sulfate A, modified barium sulfate B and modified barium sulfate C having the particle size ranges at a ratio as described herein. In some embodiments, polyacrylamide may have a linear or a cross-linked structure as described above. The polyacrylamide and the modified barium sulfate may have a content ratio as used as specified based on the content of acrylamide and the modified barium sulfate. A multi-functional weighting agent may have a composite structure, comprising polyacrylamide, and modified barium sulfate. In some embodiments, the multi-functional weighting agent is white round particles with an average particle diameter of 8-20 μm, and has a surface lubricating coefficient $K_f$ within a range of 0.05-0.1 and a compressive strength ranging from $9 \times 10^4$ Pa to $10 \times 10^4$ Pa. in some embodiments, the polyacrylamide is cross-linked. In some embodiments, the modified barium sulfate and the polyacrylamide are in a ratio by weight in a range of from about 4:5 to about 5:2, for example, being about 3:2. When values are expressed as approximations, by use of the antecedent "about," it will be understood that the particular value forms another embodiment. As used herein, "about X" (where X is a numerical value) preferably refers to ±10% of the recited value, inclusive.

In some embodiments, the multi-functional weighting agent may be white round particles, the average particle diameter may be 8-20 μm, the surface of the multi-functional weighting agent may have a lubricating coefficient $K_f$ within a range of 0.05-0.1 and a compressive strength ranging from $9 \times 10^4$ Pa to $10 \times 10^4$ Pa. Preferably, the multi-functional weighting agent has an average particle diameter of 9-16 μm, and the surface of the multifunctional weighting agent has a lubricating coefficient $K_f$ of 0.07-0.09 and a compressive strength of $9.5 \times 10^4$ Pa to $10.3 \times 10^4$ Pa. More preferably, the compressive strength is $9.62 \times 10^4$ Pa to $10.25 \times 10^4$ Pa. In the present disclosure, the multi-functional weighting agent is provided with the above parameters, it has desirable weight-increasing performance due to its high sphericity and uniform particle size, low friction force and good lubricity, and may reduce resistance in the drilling environment of high temperature and high pressure with small filter loss and desired application effects.

In some embodiments, the method for preparing the modified barium sulfate may comprise:

(S1) contacting an aqueous solution containing barium carbonate with diethylenetriamine pentaacetic acid (DTPA) to form a complexing system;

(S2) dropwise adding potassium sulfate into the complexing system to carry out reaction to produce a barium sulfate precipitate; and (S3) washing, drying and grinding the barium sulfate precipitate.

In some embodiments, the conditions of the contacting in the step (S1) comprise: the temperature may be 40-60° C., the pH may be within a range of 5-7, and the time may be 1-1.5 h. In some embodiments, formic acid may be used for adjusting the pH, and the amount of formic acid may be 0.5-2 parts by weight based on 0.5-3 parts by weight of barium carbonate. Preferably, the amount of formic acid is 0.5-2 parts by weight based on 2 parts by weight of barium carbonate. Furthermore, in the step (1), the contact of the aqueous solution containing barium carbonate with the DTPA may be carried out under a stirring condition, for example, under the condition of magnetic stirring, the stirring speed may be within a range of 1,000-2,000 revolutions per minute (rpm), preferably 1,400-1,500 rpm.

In some embodiments, the conditions of the reaction in the step (S2) comprise: the temperature may be 40-60° C., the time may be ranging from 3-10 h, and the dropping rate may be within a range of 0.5-5 mL/min.

In some embodiments, based on 0.5-3 parts by weight of barium carbonate, the diethylenetriamine pentaacetic acid may be used in an amount of 0.2-2 parts by weight, and the potassium sulfate may be used in an amount of 1-3 parts by weight. Preferably, based on 2 parts by weight of barium carbonate, the diethylenetriamine pentaacetic acid may be used in an amount of 0.2-2 parts by weight, and the potassium sulfate may be used in an amount of 1-3 parts by weight.

In some embodiments, when there is no barium sulfate precipitate is further formed, the barium sulfate precipitate is washed with distilled water or absolute ethanol, and then the barium sulfate is dried and grinded in a vacuum oven. In some embodiments, the specific operation method and conditions of the grinding are based on the criterion of without destroying or substantially breaking a structure of the multi-functional weighting agent. The skilled person in the art may select various suitable conditions to implement the invention in accordance with the above principle. Specifically, the grinding may be performed in a grinder, wherein the grinding conditions include: grinding fineness reaches 20 μm or less at a revolving speed of 1,500 rpm.

In some embodiments, the modified barium sulfate has a density greater than or equal to 4.2 g/cm$^3$, preferably within a range of 4.2-4.8 g/cm$^3$.

In a second aspect, the present disclosure provides a method for preparing the aforementioned multi-functional weighting agent, comprising:
(1) mixing the modified barium sulfate with the deionized water to obtain a mixture;
(2) heating the mixture and adjusting the pH at a presence of an initiator;
(3) sequentially dropwise adding acrylamide and ammonium persulfate to the step (2) for carrying out reaction;
(4) washing, drying and grinding the reaction product of the step (3).

In some embodiments, the mixing conditions in the step (1) include: stirring at a stirring rate of 300-400 r/min for 0.2-1 h and then standing still for 3-5 h;
The heating conditions in the step (2) comprise: a temperature within a range of 70-90° C., and a pH ranging from 4-6; Preferably in the step (3), the reaction is carried out under the conditions of ultrasonic vibration at a temperature of 70-90° C. and a dropping rate of 0.5-6 mL/min; the conditions of the ultrasonic oscillation in the invention include: the ultrasonic frequency is 30-60 kHz.

In some embodiments, the conditions of washing, drying and grinding in the step (3) are the same as those described above, and will not be repeatedly described here.

In a third aspect, the present disclosure provides a water-based drilling fluid, wherein the water-based drilling fluid contains the aforementioned multi-functional weighting agent or the multi-functional weighting agent prepared by using the aforementioned preparation method.

In some embodiments, it is preferable that based on a total weight of 100 mL water-based drilling fluid, the multi-functional weighting agent is used in an amount of 150-170 g, preferably 160 g.

In one embodiment, based on a total weight of the water-based drilling fluid, the water-based drilling fluid may further comprise 4% by weight of soil slurry, 0.6% by weight of sodium acrylate (stream pattern modifier), 4.0% by weight of sulfo-methyl phenolic resin (filtrate reducer), 18% by weight of organosilicon potassium humate QSAM-K (inhibitor), 3% by weight of graphite lubricant (lubricant), and 5% by weight of natural asphalt (e.g., RF-9). Wherein the sodium acrylate can be purchased from Chengdu Kelong Chemical Reagent plant with the model of SA. Sodium acrylate is a colorless or light yellow viscous liquid at room temperature, non-toxic, weak alkaline, insoluble in organic solvents such as ethanol and acetone, and easily soluble in water and sodium hydroxide aqueous solution. However, with the increase of the number of alkaline earth metal ions in aqueous solutions such as calcium hydroxide and magnesium hydroxide, it dissolves first and then precipitates. It can operate in alkaline and medium concentration conditions without scaling, with a molecular weight of about 500-3000. It can disperse microcrystalline or sediment of calcium carbonate, calcium sulfate and other salts in water without precipitation. The organosilicon potassium humate can be purchased from qsam-k Minquan Yongsheng drilling aid Co., Ltd. Organosilicon potassium humate can ionize the hydration gene with strong negative charge in water, which has the advantages of inhibiting the hydration expansion of clay and preventing cracks and fractures in core. It is a good shale inhibitor, and also has the effect of reducing the viscosity and filtration loss of drilling fluid. The graphite RT-1 can be purchased from Wen'an Zhongde Chemical Co., Ltd. Graphite RT-1 contains a variety of high efficiency surfactants, which can form a solid chemical film on the mud cake surface, rock surface and drilling tool surface of drilling fluid, significantly reduce the viscosity coefficient of mud cake and improve the strength of extreme pressure film. For the water sensitive collapse of mud and shale layer and the collapse of broken layer, it has good embedding sealing and restraining anti collapse effect. The natural asphalt rf-9 can be purchased from Weifang Haorui Asphalt Technology Co., Ltd. After the adsorption of the rock end face, through the demulsification in a certain period of time, the asphalt particles coalesce to form a continuous covering film to prevent the water from entering, which has the function of seamless sealing. When the downhole temperature changes greatly, its continuous plugging effect is still good. It has the function of film-forming, plugging and water-proof for most of the well sections of the long open hole well, with good plugging and anti collapse effect.

In a fourth aspect, the present disclosure provides a use method of the aforementioned water-based drilling fluid in the oil drilling.

In some embodiments, the method for applying the water-based drilling fluid in the oil drilling includes: the high-pressure drilling fluid discharged from the drilling pump passes through the ground high-pressure manifold, the riser, the water hose, the faucet, the drill pipe to reach the drill bit, the drilling fluid is ejected from a drill bit nozzle for rinsing the well bottom and carrying the rock debris, and then flowing upward along an annular space formed between the drill string and the well wall, and is discharged from the pipeline after arriving at the ground and flown into a drilling fluid pool, the whole use process of the drilling fluid ends.

The invention will be described in detail below by means of examples.

In the following examples and comparative examples: each of acrylamide (AM) (grade, analytically pure), ammonium persulfate (grade, analytically pure), barium carbonate, diethylenetriamine pentaacetic acid (DTPA), and potassium sulfate is purchased from Chengdu Kelong Chemical Reagent Factory in Sichuan Province of southwest China.

Electronic balance, accuracy 0.0001 g, purchased from Shanghai Tianping Instrument Factory in China.

Controllable constant temperature oven with the model GZX-9240, purchased from Shanghai Boxun Industrial Co., Ltd.

Electric mixer with the model JB50-D, purchased from Shanghai Specimen Model Factory in China.

A set of synthetic equipment, purchased from Chengdu Kelong Chemical Reagent Factory in Sichuan Province of southwest China.

Particle size test is completed by laser particle sizer la-950a2, which analyzes particle size by diffraction of particles or spatial distribution (scattering spectrum) of scattered light. Using furanhofer diffraction and Mie scattering theory, the test process is not affected by many factors such as temperature change, medium viscosity, sample density and surface state. As long as the sample to be tested is evenly displayed in the laser beam, namely Accurate test results can be obtained.

Preparation Example 1

The preparation example serves to illustrate the preparation method of the modified barium sulfate of the invention, the preparation method comprises the following steps:
(S1) Dissolving 2 parts by weight of barium carbonate with an average particle size of 0.3 μm, 2 μm and 20 μm fully in deionized water, heating the solution to 50° C., adding a formic acid solution to adjust the pH to 7, and then adding 1 part by weight of diethylenetriamine pentaacetic acid, stirring the solution under a stirring condition of 1,450 rpm for 1.2 h, reacting sufficiently to form a complexing system;
(S2) Slowly adding 2 parts by weight of potassium sulfate solution to the S1 complexing system at a dropping rate of 3 mL/min, and reacting at a constant temperature for 5 h to form the barium sulfate precipitate;
(S3) When there is no barium sulfate precipitate is further formed, washing and separating the barium sulfate precipitate with distilled water sufficiently, drying the barium sulfate in a vacuum oven, and then grinding the barium sulfate.

As a result, the modified barium sulfate A, modified barium sulfate B and modified barium sulfate C were obtained, wherein the modified barium sulfate A has an average particle diameter of 0.3 μm, the modified barium sulfate B has an average particle diameter of 2 μm, the modified barium sulfate C has an average particle diameter of 20 μm.

Preparation Example 2

This preparation example serves to illustrate the preparation method of the modified barium sulfate of the invention, the preparation method comprises the following steps:
(S1) Dissolving 0.5 parts by weight of barium carbonate with an average particle size of 0.05 μm, 0.5 μm and 15 μm fully in deionized water, heating the solution to 40° C., adding a formic acid solution to adjust the pH to 5, and then adding 0.2 part by weight of diethylenetriamine pentaacetic acid, stirring the solution under a stirring condition of 1,450 rpm for 1 h, reacting sufficiently to form a complexing system;
(S2) Slowly adding 1 parts by weight of potassium sulfate solution to the S1 complexing system at a dropping rate of 0.5 mL/min, and reacting at a constant temperature for 3 h to form the barium sulfate precipitate;
(S3) When there is no barium sulfate precipitate is further formed, washing and separating the barium sulfate precipitate with distilled water sufficiently, drying the barium sulfate in a vacuum oven, and then grinding the barium sulfate.

As a result, the modified barium sulfate A, modified barium sulfate B and modified barium sulfate C were obtained, wherein the modified barium sulfate A has an average particle diameter of 0.05 μm, the modified barium sulfate B has an average particle diameter of 0.5 μm, the modified barium sulfate C has an average particle diameter of 1.5 μm.

Preparation Example 3

This preparation example serves to illustrate the preparation method of the modified barium sulfate of the invention, the preparation method comprises the following steps:
(S1) Dissolving 3 parts by weight of barium carbonate with an average particle size of 0.45 μm, 3 μm and 25 μm fully in deionized water, heating the solution to 60° C., adding a formic acid solution to adjust the pH to 6, and then adding 2 part by weight of diethylenetriamine pentaacetic acid, stirring the solution under a stirring condition of 1,450 rpm for 1.5 h, reacting sufficiently to form a complexing system;
(S2) Slowly adding 3 parts by weight of potassium sulfate solution to the S1 complexing system at a dropping rate of 5 mL/min, and reacting at a constant temperature for 10 h to form the barium sulfate precipitate;
(S3) When there is no barium sulfate precipitate is further formed, washing and separating the barium sulfate precipitate with distilled water sufficiently, drying the barium sulfate in a vacuum oven, and then grinding the barium sulfate.

As a result, the modified barium sulfate A, modified barium sulfate B and modified barium sulfate C were obtained, wherein the modified barium sulfate A has an average particle diameter of 0.45 μm, the modified barium sulfate B has an average particle diameter of 3 μm, the modified barium sulfate C has an average particle diameter of 25 μm.

Example 1

The example aims to illustrate the multi-functional weighting agent of the invention and a method of preparing the same, the preparation method comprises:
(1) Adding 8 parts by weight of modified barium sulfate powder into a three-necked flask with 100 parts by weight of deionized water, stirring the solution at a stirring rate of 350 r/min for 0.2 h, and then standing still for 3 h; wherein the modified barium sulfate prepared in the Preparation Example 2 is used. That is, the modified barium sulfate A has an average particle diameter of 0.05 μm, the modified barium sulfate B has an average particle diameter of 0.5 μm, the modified barium sulfate C has an average particle diameter of 15 μm. The weight ratio of an amount of the modified barium sulfate A, the modified barium sulfate B and the modified barium sulfate C is 0.4:0.4:1, and the modified barium sulfate has a density of 4.2 $g/cm^3$;
(2) Placing the three-necked flask in a water bath kettle, heating it to 70° C., adding formic acid and adjusting pH to 4, and adding 0.2 parts by weight of dimethyl azobisisobutyrate as an initiator under a protective nitrogen atmosphere;
(3) Initially adding 5 parts by weight of acrylamide under the conditions of the ultrasonic vibration (30 KHz) and a dropping rate of 0.5 mL/min, performing a constant temperature reaction for 3 h and then adding 0.3 parts by weight of ammonium persulfate until the completion of reaction;
(4) Washing the product with absolute ethanol, drying it in a vacuum oven for 2 h, grinding and pulverizing the product.

As a result, a multi-functional weighting agent for drilling fluid labeled as S1 was obtained, and its parameters are shown in Table 1.

160 g of the multi-functional weighting agent was added to 100 mL of water-based drilling fluid, and its performance evaluation experimental data is as shown in Table 2.

Example 2

The example aims to illustrate the multi-functional weighting agent of the invention and a method of preparing the same, the preparation method comprises:
(1) Adding 11 parts by weight of modified barium sulfate powder into a three-necked flask with 100 parts by weight of deionized water, stirring the solution at a stirring rate of 300 r/min for 0.5 h, and then standing still for 3 h; wherein the modified barium sulfate prepared in the Preparation Example 1 is used. That is, the modified barium sulfate A has an average particle diameter of 0.3 μm, the modified barium sulfate B has an average particle diameter of 2 μm, the modified barium sulfate C has an average particle diameter of 20 μm. The weight ratio of an amount of the modified barium sulfate A, the modified barium sulfate B and the modified barium sulfate C is 0.5:0.5:1, and the modified barium sulfate has a density of 4.3 g/cm$^3$;
(2) Placing the three-necked flask in a water bath kettle, heating it to 80° C., adding formic acid and adjusting pH to 5, and adding 0.5 parts by weight of dimethyl azobisisobutyrate as an initiator under a protective nitrogen atmosphere;
(3) Initially adding 8 parts by weight of acrylamide under the conditions of the ultrasonic vibration (45 KHz) and a dropping rate of 3 mL/min, performing a constant temperature reaction for 3 h and then adding 2 parts by weight of ammonium persulfate until the completion of reaction;
(4) Washing the product with absolute ethanol, drying it in a vacuum oven for 3 h, grinding and pulverizing the product.

As a result, a multi-functional weighting agent for drilling fluid labeled as S2 was obtained, and its parameters are shown in Table 1.

160 g of the multi-functional weighting agent was added to 100 mL of water-based drilling fluid, and its performance evaluation experimental data is as shown in Table 2.

Example 3

The example aims to illustrate the multi-functional weighting agent of the invention and a method of preparing the same, the preparation method comprises:
(1) Adding 15 parts by weight of modified barium sulfate powder into a three-necked flask with 100 parts by weight of deionized water, stirring the solution at a stirring rate of 400 r/min for 1 h, and then standing still for 5 h; wherein the modified barium sulfate prepared in the Preparation Example 3 is used. That is, the modified barium sulfate A has an average particle diameter of 0.45 μm, the modified barium sulfate B has an average particle diameter of 3 μm, the modified barium sulfate C has an average particle diameter of 25 μm. The weight ratio of an amount of the modified barium sulfate A, the modified barium sulfate B and the modified barium sulfate C is 0.6:0.6:1, and the modified barium sulfate has a density of 4.5 g/cm$^3$;
(2) Placing the three-necked flask in a water bath kettle, heating it to 90° C., adding formic acid and adjusting pH to 6, and adding 1 parts by weight of dimethyl azobisisobutyrate as an initiator under a protective nitrogen atmosphere; wherein the mass ratio of dimethyl azobisisobutyrate to sodium sulfite is 0.6:1;
(3) Initially adding 10 parts by weight of acrylamide under the conditions of the ultrasonic vibration (60 KHz) and a dropping rate of 6 mL/min, performing a constant temperature reaction for 3 h and then adding 4 parts by weight of ammonium persulfate until the completion of reaction;
(4) Washing the product with absolute ethanol, drying it in a vacuum oven for 5 h, grinding and pulverizing the product.

As a result, a multi-functional weighting agent for drilling fluid labeled as S3 was obtained, and its parameters are shown in Table 1.

160 g of the multi-functional weighting agent was added to 100 mL of water-based drilling fluid, and its performance evaluation experimental data is as shown in Table 2.

Example 4

The example aims to illustrate the multi-functional weighting agent of the invention and a method of preparing the same, the preparation method comprises:
(1) Adding 6 parts by weight of modified barium sulfate powder into a three-necked flask with 100 parts by weight of deionized water, stirring the solution at a stirring rate of 320 r/min for 0.2 h, and then standing still for 3 h; wherein the modified barium sulfate prepared in the Preparation Example 2 is used. That is, the modified barium sulfate A has an average particle diameter of 0.05 μm, the modified barium sulfate B has an average particle diameter of 0.5 μm, the modified barium sulfate C has an average particle diameter of 15 μm. The weight ratio of an amount of the modified barium sulfate A, the modified barium sulfate B and the modified barium sulfate C is 0.45:0.45:1, and the modified barium sulfate has a density of 4.5 g/cm$^3$;
(2) Placing the three-necked flask in a water bath kettle, heating it to 70° C., adding formic acid and adjusting pH to 4, and adding 0.1 parts by weight of dimethyl azobisisobutyrate as an initiator under a protective nitrogen atmosphere;
(3) Initially adding 5 parts by weight of acrylamide under the conditions of the ultrasonic vibration (45 KHz) and a dropping rate of 2.5 mL/min, performing a constant temperature reaction for 3 h and then adding 3 parts by weight of ammonium persulfate until the completion of reaction;
(4) Washing the product with absolute ethanol, drying it in a vacuum oven for 2 h, grinding and pulverizing the product.

As a result, a multi-functional weighting agent for drilling fluid labeled as S4 was obtained, and its parameters are shown in Table 1.

160 g of the multi-functional weighting agent was added to 100 mL of water-based drilling fluid, and its performance evaluation experimental data is as shown in Table 2.

Example 5

The example aims to illustrate the multi-functional weighting agent of the invention and a method of preparing the same, the preparation method comprises:
(1) Adding 20 parts by weight of modified barium sulfate powder into a three-necked flask with 100 parts by weight of deionized water, stirring the solution at a stirring rate of 380 r/min for 1 h, and then standing still for 3 h; wherein the modified barium sulfate prepared in the Preparation Example 3 is used. That is, the modified barium sulfate A has an average particle diameter of 0.45 μm, the modified barium sulfate B has an average particle diameter of 3 μm, the modified barium sulfate C has an average particle diameter of 25 μm. The weight ratio of an amount of the modified barium sulfate A, the modified barium sulfate B and the modified barium sulfate C is 0.55:0.55:1, and the modified barium sulfate has a density of 4.1 g/cm³;

(2) Placing the three-necked flask in a water bath kettle, heating it to 90° C., adding formic acid and adjusting pH to 6, and adding 0.5 parts by weight of dimethyl azobisisobutyrate as an initiator under a protective nitrogen atmosphere;

(3) Initially adding 15 parts by weight of acrylamide under the conditions of the ultrasonic vibration (45 KHz) and a dropping rate of 3 mL/min, performing a constant temperature reaction for 3 h and then adding 5 parts by weight of ammonium persulfate until the completion of reaction;

(4) Washing the product with absolute ethanol, drying it in a vacuum oven for 5 h, grinding and pulverizing the product.

As a result, a multi-functional weighting agent for drilling fluid labeled as S5 was obtained, and its parameters are shown in Table 1.

160 g of the multi-functional weighting agent was added to 100 mL of water-based drilling fluid, and its performance evaluation experimental data is as shown in Table 2.

Comparative Example 1

A multi-functional weighting agent is prepared in the substantially identical manner as in Example 1, except for the following differences:

(1) Adding 21 parts by weight of the modified barium sulfate powder into a three-necked flask containing an appropriate amount of deionized water, stirring the solution for 1 h and then standing still for 3 h; wherein the modified barium sulfate prepared in Preparation Example 2 is used. That is, the modified barium sulfate A has an average particle diameter of 0.05 μm, the modified barium sulfate B has an average particle diameter of 0.5 μm, the modified barium sulfate C has an average particle diameter of 15 μm; wherein the weight ratio of an amount of the modified barium sulfate A, the modified barium sulfate B and the modified barium sulfate C is 0.3:0.3:1;

(2) Placing the three-necked flask in a water bath kettle, heating it to 70° C., adding formic acid and adjusting pH to 4, and adding 0.1 parts by weight of dimethyl azobisisobutyrate as an initiator under a protective nitrogen atmosphere;

(3) Slowly adding 5 parts by weight of acrylamide under the ultrasonic vibration (45 KHz), performing a constant temperature reaction for 3 h and then adding 0.1 parts by weight of ammonium persulfate until the completion of reaction;

(4) Washing the product with absolute ethanol, drying it in a vacuum oven for 2 h, grinding and pulverizing the product.

As a result, a treatment agent for drilling fluid labeled as DS1 was obtained, and its parameters are shown in Table 1.

160 g of the treatment agent was added to 100 mL of water-based drilling fluid, and its performance evaluation experimental data is as shown in Table 2.

Comparative Example 2

A multi-functional weighting agent is prepared in the substantially identical manner as in Example 1, except for the following differences:

(1) Adding 3 parts by weight of the modified barium sulfate powder into a three-necked flask containing an appropriate amount of deionized water, stirring the solution for 1 h and then standing still for 3 h; wherein the modified barium sulfate A has an average particle diameter of 0.5 μm, the modified barium sulfate B has an average particle diameter of 3 μm, the modified barium sulfate C has an average particle diameter of 26 μm; wherein the weight ratio of an amount of the modified barium sulfate A, the modified barium sulfate B and the modified barium sulfate C is 0.7:0.7:1;

(2) Placing the three-necked flask in a water bath kettle, heating it to 70° C., adding formic acid and adjusting pH to 4, and adding 4 parts by weight of dimethyl azobisisobutyrate as an initiator under a protective nitrogen atmosphere;

(3) Slowly adding 16 parts by weight of acrylamide under the ultrasonic vibration, performing a constant temperature reaction for 3 h and then adding 3 parts by weight of ammonium persulfate until the completion of reaction;

(4) Washing the product with absolute ethanol, drying it in a vacuum oven for 2 h, grinding and pulverizing the product.

As a result, a treatment agent for drilling fluid labeled as DS2 was obtained, and its parameters are shown in Table 1.

160 g of the treatment agent was added to 100 mL of water-based drilling fluid, and the performance evaluation experimental data is as shown in Table 2.

Comparative Example 3

A multi-functional weighting agent was prepared in the substantially identical manner as in Example 1, except for the following differences: the modified barium sulfate only includes the modified barium sulfate A, the consequently produced treating agent is labeled as DS3, and its parameters are as shown in Table 1. In addition, 120 g of the treatment agent was added into 100 mL of water-based drilling fluid, and its performance evaluation experimental data is as shown in Table 2.

Comparative Example 4

A multi-functional weighting agent was prepared in the substantially identical manner as in Example 1, except for the following differences: the modified barium sulfate merely includes the modified barium sulfate A and the modified barium sulfate B, and the consequently produced treating agent is labeled as DS4, and its parameters are as shown in Table 1. In addition, 180 g of the treatment agent was added into 100 mL of water-based drilling fluid, and its performance evaluation experimental data is as shown in Table 2.

Comparative Example 5

The ordinary barite was used as the treating agent with a label DS5. The parameters of ordinary barite are as shown in Table 1. Moreover, 160 g of ordinary barite was added into 100 mL of water-based drilling fluid, and its performance evaluation experimental data is as shown in Table 2.

Comparative Example 6

The treatment agent is composed of 15 g lubricant graphite glass microspheres, 25 g filtrate reducer lignite resin, 120 g weighting agent barite, and the treatment agent is labeled as DS6; the parameters of the treatment agent are as shown in Table 1. In addition, 160 g of the treatment agent was added into 100 mL of water-based drilling fluid, and its performance evaluation experimental data is shown in Table 2.

Comparative Example 7

A multi-functional weighting agent was prepared in the substantially identical manner as in Example 1, except for the following differences: the modified barium sulfate powder is replaced with the ordinary barite, and the consequently produced treating agent is labeled as DS7, the parameters of the treating agent are as shown in Table 1. In addition, 160 g of the treating agent was added into 100 mL of a water-based drilling fluid, wherein the ordinary barite has an average particle diameter of 18.24-19 µm, a density of 4.28 g/cm³, and a specific surface area of 0.48 m²/g, the particles are relatively large and the particles present a blocky structure.

The performance evaluation experimental data is as shown in Table 2; the parameters of the treatment agent are as shown in Table 1.

Comparative Example 8

A multi-functional weighting agent was prepared in the substantially identical manner as in Example 1, except for the following differences: the modified barium sulfate A has a particle diameter of 0.04 µm, the modified barium sulfate B has a particle diameter of 4 µm, and the modified barium sulfate C has a particle size of 12 µm; the consequently produced treating agent is labeled as DS8, and the parameters of the treating agent are as shown in Table 1. In addition, 160 g of the treatment agent was added into 100 mL of water-based drilling fluid, and its performance evaluation experimental data is as shown in Table 2.

Comparative Example 9

A multi-functional weighting agent was prepared in the substantially identical manner as in Example 1, except for the following differences: the modified barium sulfate A has a particle diameter of 5 µm, the modified barium sulfate B has a particle diameter of 0.3 µm, and the modified barium sulfate C has a particle size of 30 µm; the consequently produced treating agent is labeled as DS9, and the parameters of the treating agent are as shown in Table 1. In addition, 160 g of the treatment agent was added into 100 mL of water-based drilling fluid, and its performance evaluation experimental data is as shown in Table 2.

Comparative Example 10

A multi-functional weighting agent was prepared in the substantially identical manner as in Example 1, except for the following differences: the density of the modified barium sulfate was 4 g/cm³, the consequently produced treating agent is labeled as DS10, and the parameters of the treating agent are as shown in Table 1. In addition, 160 g of the treatment agent was added into 100 mL of water-based drilling fluid, and its performance evaluation experimental data is as shown in Table 2.

Test Example 1

Density Testing of Water-Based Drilling Fluids.

The densities of water-based drilling fluids containing the multi-functional weighting agents S1-S5 and DS1-DS10 were tested by using a drilling fluid densitometer.

Specifically, the method includes the following steps:
(1) First, calibrating the instrument;
(2) Adding the configured multi-functional weighting agents S1-S5 and DS1-DS10 to the experimental instrument, respectively, covering the cup lid and ensuring that some drilling fluid exudes from the small hole of the cup lid and tightly pressing the cup lid.

The results are as shown in Table 2.

Test Example 2

Filter Loss Testing of Water-Based Drilling Fluids.

The GLS42-2A high temperature and high pressure (HTHP) filter press was used for testing the filtrate loss condition of water-based drilling fluids containing multi-functional weighting agents S1-S5 and DS1-DS10, respectively.

The specific operations are as follows:
(1) Putting the configured multi-functional weighting agents S1-S5 and DS1-DS10 into a slurry cup, and the liquid surface should not be higher than ½ of the upper end of the cup;
(2) Closing the upper end air valve and lower end air valve of the cup, placing the slurry cup into a heating sleeve, and inserting a thermometer into the thermometer hole;
(3) Pressurizing, recording the milliliter number $FL_{API}$ of filtrate volume under a variety of temperatures and pressures.

The results are shown in Table 2.

Test Example 3

Lubrication Coefficient Test for Water-Based Drilling Fluids.

The lubricating coefficient $K_f$ of the multi-functional weighting agents S1-S5 and DS1-DS10 was tested by the NR-1 drilling fluid lubricity determinator, respectively.

The specific operations are as follows:
(1) Loading the drilling fluid to be tested into a sample cup;
(2) Starting a motor under a non-loaded circumstance and running the motor until a pointer of the amperemeter is stable;
(3) Slowly pressurizing to 50 lbs with a torque wrench, running for 5 minutes until the amperemeter pointer is stable, recording the amperemeter reading and multiplying the reading with 0.01, the product is the lubrication coefficient value of the drilling fluid being tested.

The results are as shown in Table 2.

Test Example 4

The sphericity of the multi-functional weighting agents S1-S5 and DS1-DS10 was tested with reference to the sphericity and roundness comparison chart in the Chinese national standard Q/SY125-2007-«China National Petroleum Corporation Enterprise Standard».

The specific operations are as follows:
30-40 particles were randomly selected from the samples to be tested, and observed under an electron microscope. The sphericity of each particle in the sample was determined according to the plate, and the average sphericity of this batch of sample is finally calculated.

The results are shown in Table 2.

TABLE 1

| Multi-functional weighting agent | Average particle diameter (µm) | Sphericity (%) | Compressive strength (Pa) | $K_f$ |
| --- | --- | --- | --- | --- |
| S1 | 15 | 0.92 | $9.62 \times 10^4$ | 0.08 |
| S2 | 16 | 0.93 | $10.25 \times 10^4$ | 0.07 |
| S3 | 11 | 0.91 | $9.82 \times 10^4$ | 0.08 |

TABLE 1-continued

| Multi-functional weighting agent | Average particle diameter (μm) | Sphericity (%) | Compressive strength (Pa) | $K_f$ |
|---|---|---|---|---|
| S4 | 9 | 0.89 | $9.73 \times 10^4$ | 0.09 |
| S5 | 13 | 0.90 | $9.68 \times 10^4$ | 0.09 |
| DS1 | 15 | 0.76 | $5.21 \times 10^4$ | 0.13 |
| DS2 | 12 | 0.69 | $6.62 \times 10^4$ | 0.15 |
| DS3 | 11 | 0.54 | $4.69 \times 10^4$ | 0.21 |
| DS4 | 17 | 0.72 | $6.36 \times 10^4$ | 0.23 |
| DS5 | 19 | 0.63 | $4.47 \times 10^4$ | 0.32 |
| DS6 | 16 | 0.59 | $3.68 \times 10^4$ | 0.35 |
| DS7 | 19 | 0.64 | $4.89 \times 10^4$ | 0.36 |
| DS8 | 12 | 0.58 | $5.31 \times 10^4$ | 0.29 |
| DS9 | 9 | 0.71 | $3.56 \times 10^4$ | 0.34 |
| DS10 | 14 | 0.53 | $5.65 \times 10^4$ | 0.27 |

It is illustrated in Table 1 that the multi-functional weighting agents prepared in the Examples S1-S5 have high sphericity, uniform particle size, high compressive strength, small lubricating coefficient, low friction force, good lubricity and desirable weighting performance. The treatment agents prepared by Comparative Examples DS1-DS10 have low sphericity, uneven particle size, low compressive strength and large lubricating coefficient. It demonstrates that the multi-functional weighting agents of the invention have desired performance and can meet the field application requirements of the drilling fluid.

TABLE 2

| Multi-functional weighting agent | Added amount(g) | ρ (g/cm³) | $FL_{API}$ (mL) | $K_{f-1}$ |
|---|---|---|---|---|
| S1 | 160 g | 1.21 | 22.3 | 0.15 |
| S2 | 160 g | 1.23 | 21.5 | 0.12 |
| S3 | 160 g | 1.28 | 22.7 | 0.13 |
| S4 | 160 g | 1.26 | 25.4 | 0.16 |
| S5 | 160 g | 1.25 | 24.2 | 0.13 |
| DS1 | 160 g | 1.35 | 32.6 | 0.56 |
| DS2 | 160 g | 1.36 | 33.5 | 0.45 |
| DS3 | 120 g | 1.28 | 36.2 | 0.82 |
| DS4 | 180 g | 1.24 | 31.9 | 0.66 |
| DS5 | 160 g | 1.29 | 32.8 | 0.45 |
| DS6 | 160 g | 1.33 | 36.3 | 0.59 |
| DS7 | 160 g | 1.24 | 39.2 | 0.52 |
| DS8 | 160 g | 1.36 | 29.8 | 0.64 |
| DS9 | 160 g | 1.35 | 27.3 | 0.58 |
| DS10 | 160 g | 1.23 | 28.2 | 0.69 |

As illustrated in Table 2, the water-based drilling fluids comprising the multi-functional weighting agents prepared in Examples S1-S5 have a density ranging from 1.21-1.28 g/cm³, a filter loss between 21.5-25.4 mL, and a lubricating coefficient $K_{f-1}$ less than 0.2; while the water-based drilling fluid comprising the treatment agents prepared by the Comparative Examples DS1-DS10 have a density ranging from 1.23-1.36 g/cm³, a filter loss between 27.3-39.2 mL, and a lubrication coefficient $K_f$ greater than or equal to 0.4.

Therefore, Table 2 demonstrates that the multi-functional weighting agents of the invention can reduce resistance in the drilling environment of high temperature and high pressure with small filter loss and desired application effects.

While the invention is described above in detail in some preferred embodiments, the invention is not limited to those embodiments. Various simple variations, including combinations of the technical features in any other appropriate way, can be made to the technical scheme of the invention within the scope of the technical concept of the invention, but such variations and combinations shall be deemed as disclosed content in the invention and falling in the protection scope of the invention.

The invention claimed is:

1. A multi-functional weighting agent having a composite structure, comprising polyacrylamide, and modified barium sulfate, wherein the modified barium sulfate and the polyacrylamide are in a ratio by weight in a range of from about 4:5 to about 5:2.

2. The multi-functional weighting agent of claim 1, wherein the polyacrylamide is cross-linked.

3. The multi-functional weighting agent of claim 1, wherein the modified barium sulfate and the polyacrylamide are in a ratio by weight being about 3:2.

4. The multi-functional weighting agent of claim 1, wherein the modified barium sulfate comprises modified barium sulfate A, modified barium sulfate B and modified barium sulfate C; wherein the modified barium sulfate A has an average particle diameter of 0.05-0.45 μm, the modified barium sulfate B has an average particle diameter of 0.5-3 μm, and the modified barium sulfate C has an average particle diameter of 15-25 μm.

5. The multi-functional weighting agent of claim 4, wherein a weight ratio of the modified barium sulfate A, the modified barium sulfate B and the modified barium sulfate C is (0.4-0.6):(0.4-0.6): 1.

6. The multi-functional weighting agent of claim 5, wherein the multi-functional weighting agent is white round particles with an average particle diameter of 8-20 μm, and has a surface lubricating coefficient $K_f$ within a range of 0.05-0.1 and a compressive strength ranging from $9 \times 10^4$ Pa to $10 \times 10^4$ Pa.

7. The multi-functional weighting agent of claim 1, wherein the modified barium sulfate has a density ranging from 4.2-4.8 g/cm³.

8. A water-based drilling fluid, comprising the multi-functional weighting agent of claim 1; wherein the multi-functional weighting agent is in an amount of 150-170 g, based on a total weight of 100 mL water-based drilling fluid.

9. A method for preparing the multi-functional weighting agent of claim 1, wherein the method comprises:
(1) mixing a modified barium sulfate with deionized water to obtain a mixture;
(2) heating the mixture and adjusting a pH of the mixture at a presence of an initiator;
(3) sequentially dropwise adding acrylamide and ammonium persulfate to step (2) for carrying out reaction;
(4) washing, drying and grinding the reaction product of step (3).

10. The method of claim 9, wherein mixing conditions in step (1) include: stirring the mixture at a stirring rate of 300-400 r/min for 0.2-1 h and then standing still for 3-5 h; wherein heating conditions in step (2) comprise: a temperature within a range of 70-90° C., and a pH ranging from 4-6; wherein reaction conditions in step (3) comprise: a temperature within a range of 70-90° C., and a dropping rate ranging from 0.5-6 mL/min.

11. The method of claim 9, wherein the modified barium sulfate is used in an amount of 5-20 parts by weight, the acrylamide is used in an amount of 5-15 parts by weight, and the ammonium persulfate is used in an amount of 0.3-6 parts by weight, based on 100 parts by weight of deionized water.

12. The method of claim 11, wherein the modified barium sulfate is used in an amount of 8-15 parts by weight, the acrylamide is used in an amount of 6-10 parts by weight, and the ammonium persulfate is used in an amount of 0.5-5 parts by weight, based on 100 parts by weight of deionized water.

13. The method of claim 9, wherein the modified barium sulfate comprises modified barium sulfate A, modified barium sulfate B and modified barium sulfate C; wherein the modified barium sulfate A has an average particle diameter of 0.05-0.45 μm, the modified barium sulfate B has an average particle diameter of 0.5-3 μm, and the modified barium sulfate C has an average particle diameter of 15-25 μm.

14. The method of claim 9, wherein the initiator is dimethyl azobisisobutyrate and/or sodium sulfite, in an amount of 0.1-4 parts by weight based on 100 parts by weight of deionized water.

15. The method of claim 14, wherein a weight ratio of the modified barium sulfate A, the modified barium sulfate B and the modified barium sulfate C is (0.4-0.6):(0.4-0.6):1.

16. The method of claim 9, wherein the method for preparing the modified barium sulfate comprises the following steps:

(S1) contacting an aqueous solution containing barium carbonate with diethylenetriamine pentaacetic acid (DTPA) to form a complexing system;

(S2) dropwise adding potassium sulfate into the complexing system to carry out reaction to produce a barium sulfate precipitate; and (S3) washing, drying and grinding the barium sulfate precipitate.

17. The method of claim 16, wherein conditions of the contacting in the step (S1) comprise: the temperature is 40-60° C., the pH is within a range of 5-7, and the time is 1-1.5 h; wherein conditions of the reaction in the step (S2) comprise: a temperature of 40-60° C., a time ranging from 3-10 h, and a dropping rate within a range of 0.5-5 mL/min.

18. The method of claim 16, wherein the diethylenetriamine pentaacetic acid is used in an amount of 0.2-2 parts by weight, and the potassium sulfate is used in an amount of 1-3 parts by weight, based on 0.5-3 parts by weight of barium carbonate.

19. The method of claim 9, wherein the modified barium sulfate has a density greater than or equal to 4.2 $g/cm^3$, or in a range of 4.2-4.8 $g/cm^3$.

* * * * *